Nov. 22, 1960     W. C. DUNCAN     2,961,630
SELF-LOCKING COUPLING DEVICE
Filed Oct. 5, 1959     3 Sheets-Sheet 1
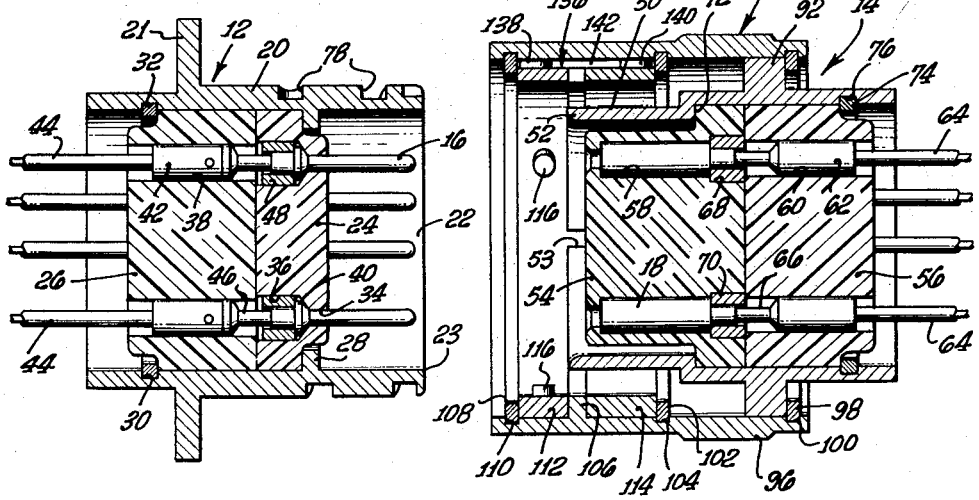
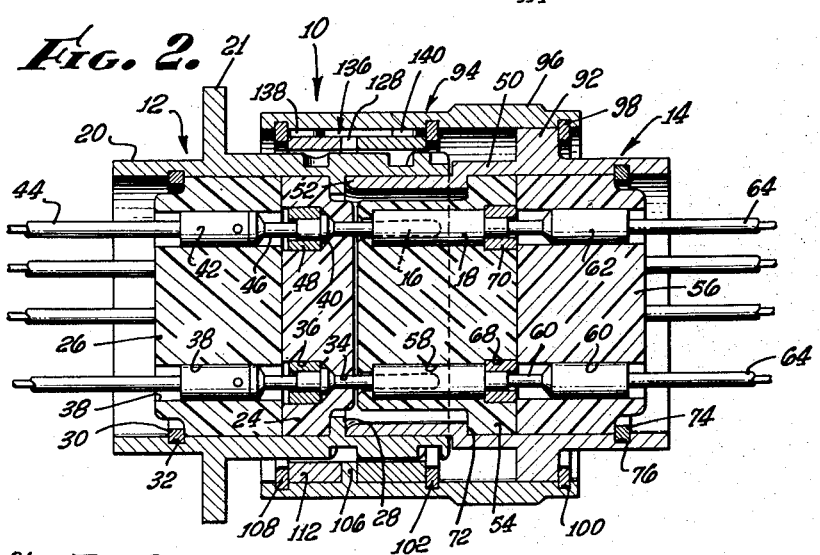
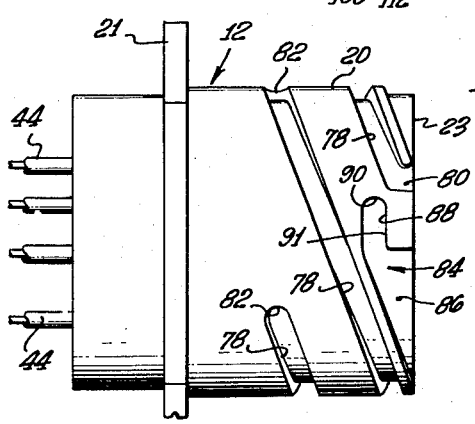
WILLIAM C. DUNCAN
INVENTOR.
BY Huebner & Worrel
ATTORNEYS.

Nov. 22, 1960 W. C. DUNCAN 2,961,630
SELF-LOCKING COUPLING DEVICE
Filed Oct. 5, 1959 3 Sheets-Sheet 2
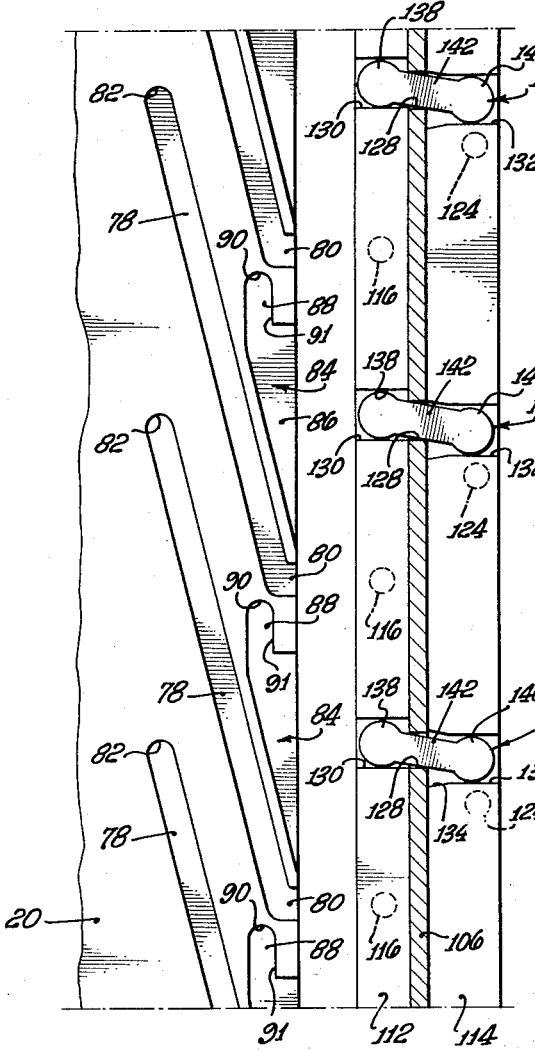
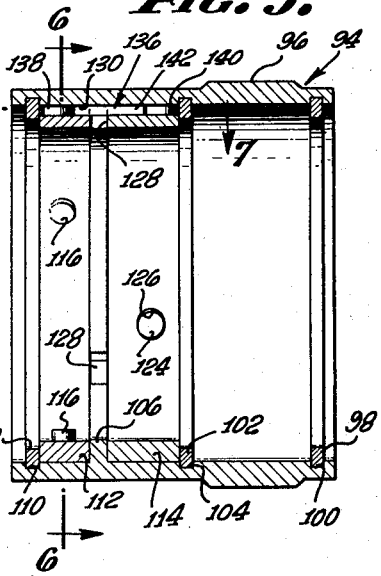
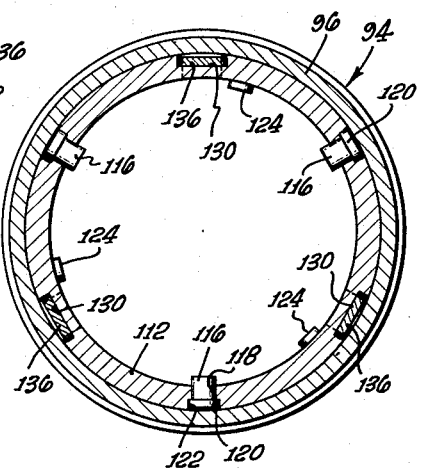
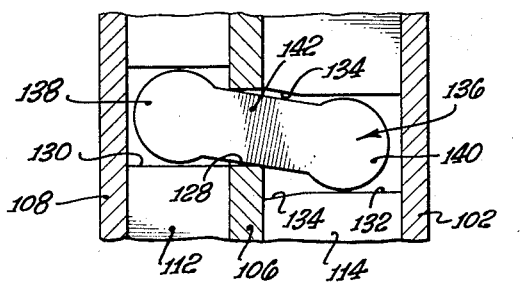
WILLIAM C. DUNCAN
INVENTOR.
BY Huebner & Worrel
ATTORNEYS.

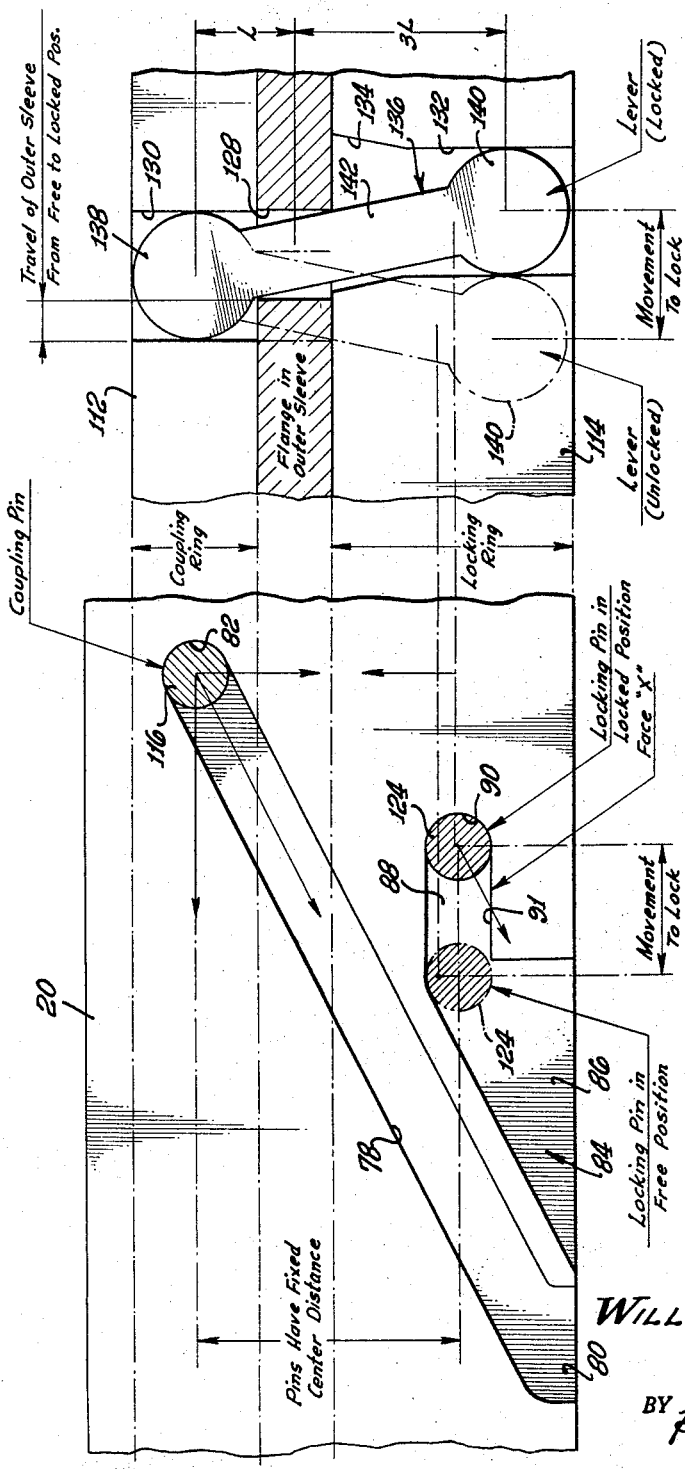

United States Patent Office 2,961,630
Patented Nov. 22, 1960

2,961,630

SELF-LOCKING COUPLING DEVICE

William C. Duncan, Los Angeles, Calif., assignor to Cannon Electric Company, Los Angeles, Calif., a corporation of California Filed Oct. 5, 1959, Ser. No. 844,544

8 Claims. (Cl. 339—90)

The present invention relates to a coupling device for releasably securing a pair of engageable members, and it relates particularly to a coupling device for use in a multi-contact electrical connector for securing a plug connector member within a receptacle connector member.

It is an object of the present invention to provide an improved coupling device for releasably securing a pair of engageable members in which a coupling nut assembly on one of the members is operatively engageable over the other member by rotary coupling movement, the completion of this rotary coupling movement causing the coupling nut assembly to be locked in its coupled position, a substantial axial force on the coupling nut being required in order to release the lock and permit rotation of the coupling nut in the direction for uncoupling the device.

Another object of this invention is to provide a low torque rotary coupling device particularly adapted for use in coupling together the male and female portions of an electrical connector, the coupling device including a coupling nut assembly which is automatically locked at the completion of its rotary coupling movement against accidental rotation in a direction to uncouple the device, the means for locking the coupling nut assembly being vibration-proof, and being independent of spring locking means, whereby wide variations in ambient temperature and vibrations will not adversely effect the locking of the device by damaging one or more locking springs such as those conventionally used in coupling devices.

Another object of the present invention is to provide a self-locking coupling device for an electrical connector comprising plug and receptacle connector members, the coupling device including an external helical coupling groove and an external locking groove on one of the connector members, and a rotatably mounted external coupling nut assembly on the other connector member, the coupling nut assembly including a rotatably shiftable, axially fixed internal coupling ring supporting an internal coupling pin that is operatively engageable in the coupling groove, and an internal locking ring rotatably shiftable and axially fixed within the coupling nut assembly in axially spaced relation to the coupling ring, the locking ring supporting an internal locking pin that is operatively engageable in the locking groove, and a lever member pivotally mounted in the coupling nut assembly axially between the coupling and locking rings, the lever member being pivotally engaged with the coupling and locking rings on opposite sides of its said pivotal mounting, and the axial distance from the pivotal mounting of the lever member to the engagement of the lever member with the coupling ring being substantially less than the axial distance from the pivotal mounting of the lever member to its engagement with the locking ring, whereby the male and female connector members may be axially engaged and then drawn together by rotation of the coupling nut assembly with the coupling pin engaged in the coupling groove and the locking pin engaged in the locking groove, with further rotary movement of the coupling nut when the coupling pin is stopped at the inner end of the coupling groove causing the lever member to rotatably shift the locking ring and locking pin into a locking position with the locking pin in locking engagement in the locking groove, the coupling remaining in this locking position until an axial force is applied to the coupling nut assembly to hold the coupling pin and coupling ring stationary while the nut assembly is rotated in the uncoupling direction to permit the lever member to rotatably shift the locking ring and locking pin out of locking engagement in the said locking groove, whereby further rotation of the coupling nut in the uncoupling direction will uncouple the coupling pin from the coupling groove to permit disengagement of the connector members.

A further object of the persent invention is to provide a self-locking coupling device of the character described which is simple and sturdy in construction, convenient to operate, and positive in its coupling and locking actions.

Further objects and advantages of this invention will appear during the course of the following part of this specification wherein details of construction and the mode of operation of a preferred embodiment are described with reference to the accompanying drawing, in which:

Fig. 1 is an axial section of an electrical connector embodying the present invention, with the receptacle and plug connector members separated;

Fig. 2 is an axial section similar to Fig. 1 but with the receptacle and plug connector members operatively engaged;

Fig. 3 is a side elevation view of the receptacle connector member shown in Figs. 1 and 2, particularly illustrating the presently preferred coupling and locking grooves;

Fig. 4 is a schematic view of the coupling and locking portions of the receptacle and plug connector members, with the parts opened out into plan view and with the receptacle and plug connector members axially separated;

Fig. 5 is an axial section of the tubular barrel portion of the plug connector member, with the coupling and locking rings mounted therein;

Fig. 6 is a transverse section along the line 6—6 in Fig. 5;

Fig. 7 is a greatly enlarged fractional section along line 7—7 in Fig. 5 illustrating the presently preferred lever construction and mounting for providing the self-locking action of the present invention; and Fig. 8 is a schematic view illustrating the shifting of the parts between the unlocked and the locked positions.

Referring to the drawings in greater detail, and at first primarily to Figs. 1 and 2 thereof, the present invention has been illustrated as applied to an electrical connector 10 which includes a receptacle connector member 12 and a plug connector member 14. It is to be understood, however, that the coupling device of the present invention has general application for releasably joining a pair of engageable members, and is not necessarily limited to electrical connectors.

The receptacle connector member 12 contains a plurality of pin contact elements or terminals 16, and the plug connector member 14 contains a plurality of socket contact elements or terminals 18, the connector members 12 and 14 being so designated that when joined together the pin terminals 16 will mate with respective socket terminals 18 to complete a plurality of electrical circuits. It is to be understood, of course, that the pin terminals may be mounted in the plug, and the socket terminals may be mounted in the receptacle.

Although the details of construction and mounting of the contact terminals do not constitute essentials of the present invention, they will nevertheless be described briefly during the course of the following description for completeness and convenience of reference.

The receptacle connector member 12 includes a tubular shell 20 having an outer mounting flange 21 integrally formed thereon which serves to mount the receptacle member 12 upon a panel or electrical instrument for which the connector is designed. An axial polarizing key 22 is formed in the front marginal portion 23 of the tubular shell 20 within which the forward portion of the plug connector member 14 is received.

Mounted within the tubular shell 20 of the receptacle connector member 12 is an insulation body comprising a front insulation block 24 and a rear insulation block 26. The insulation blocks 24 and 26 are held against axial movement within shell 20 by an inwardly directed annular flange 28 formed in shell 20 forward of the front insulation block 24, and a retainer ring 30 disposed in an annular groove 32 to the rear of the rear insulation block 26.

The front insulation block 24 is provided with a plurality of axial pin-receiving bores 34, with counterbores 36 being provided from the inner or rear face of the front insulation block 24. Axial bores 38 in the rear insulation block 26 are aligned with the respective bores 34. The pin contact elements 16 project forwardly through the bores 34 in the front insulation block 24, and have radial enlargements 40 thereon which seat in the forward ends of counterbores 36. Enlarged rearward ends 42 of the pin contact elements 16 seat in the bores 38 of the rear insulation block 26, and are formed as cups to receive the ends of respective conductor wires 44, which are soldered or crimped into place. An annular recess 46 of stepped form is provided on each of the pin contact elements 16 between the enlargement 40 and the enlarged rearward end 42 to receive a lock sleeve 48 of insulating material that seats in the respective counterbore 36 to prevent rearward movement of each pin contact element.

The plug connector member 14 comprises a tubular barrel 50 having a front marginal portion 52 operatively engageable within the front marginal portion 23 of the receptacle connector member 12. A forwardly opening axial key-way 53 is provided in the front marginal portion 52 of the tubular barrel 50 for receiving the axial polarizing key 22 of the receptacle shell 20, whereby the receptacle and plug connector members will be correctly oriented or polarized relative to each other as they are brought together for operative engagement.

Mounted within the tubular barrel 50 is an insulation body comprising a front insulation block 54 and a rear insulation block 56, the blocks 54 and 56 having respective aligned axial bores 58 and 60 for receiving the socket contact elements 18. The rearward ends 62 of the socket contact elements 18 are formed as cups to receive the ends of respective conductor wires 64 which are soldered or crimped into place. An annular recess 66 of stepped form is provided in each of the socket contact elements 18, and counterbores 68 are provided at the rearward ends of bores 58, whereby lock sleeves 70 disposed in the respective annular recesses 66 and positioned in respective counterbores 68 will hold the socket contact elements 18 against rearward movement in the insulation body.

The insulation body comprising insulation blocks 54 and 56 is axially positioned within the tubular barrel 50 between a rearwardly facing shoulder 72 which engages the front insulation block 54, and a retainer ring 74 which engages the rear insulation block 56 and is mounted in a suitable annular groove 76 in the rear portion of tubular barrel 50.

Referring now to my presently preferred self-locking coupling structure, I provide one or more helical coupling grooves 78, preferably three in number, in the outer surface of tubular shell 20 forward of the mounting flange 21. The helical coupling grooves 78 have forwardly facing openings 80 at the forward edge of the receptacle shell 20, and have closed inner or rearward ends 82.

Also disposed in the outer surface of the receptacle shell 20 forward of the mounting flange 21 are one or more locking grooves 84. I prefer to provide the same number of locking grooves 84 as helical coupling grooves 78, so that three of the locking grooves 84 are preferred. Each of the locking grooves 84 is provided with a forwardly opening triangular portion 86 communicating with the front edge of the receptacle shell 20, and a transverse rear slot portion 88 with a closed inner end 90. The transverse slot portions 88 are preferably substantially parallel, particularly at their rearwardly facing sides 91, with the front edge of the shell 20.

In the presently preferred embodiment of this invention the helical coupling grooves 78 and locking grooves 84 will be alternately disposed about the periphery of the receptacle shell 20. The disposition of the three helical coupling grooves 78 and the three locking grooves 84 is perhaps best illustrated in Fig. 4 of the drawings, in which the forward portion of the receptacle shell 20 has been opened out in a schematic plan view. The coupling grooves 78 and locking grooves 84 may be of different depths to avoid mis-mating.

Referring now to the portion of the self-locking coupling structure provided on the plug connector member 14, an annular flange 92 is provided on the outside of the tubular plug barrel 50, and a coupling nut assembly 94 is rotatably mounted on the flange 92.

An outer sleeve portion 96 of the coupling nut assembly 94 has its rear portion disposed over the flange 92, and is retained against forward movement over the flange 92 by a suitable retainer ring 98 disposed in an annular groove 100 near the rear end of sleeve 96. A similar retainer ring 102 is disposed in an annular groove 104 in the inner wall of sleeve 96 forward of the flange 92 and functions in part to retain the sleeve 96 over flange 92.

Spaced forwardly of the retainer ring 102 and integrally formed within the sleeve portion 96 of the coupling nut assembly 94 is a radially inwardly directed annular flange 106, and spaced forwardly of the flange 106 and near the forward edge of sleeve 96 is a retainer ring 108 mounted in a suitable inwardly facing groove 110.

Disposed between the annular flange 106 and the forward retainer ring 108 within the coupling nut sleeve 96 is a rotatably shiftable coupling ring 112, and similarly disposed between the retainer ring 102 and the annular flange 106 within sleeve 96 is a rotatably shiftable locking ring 114. For purposes which will hereinafter become apparent, I prefer to apply a locking ring 114 which is substantially wider in axial dimension than the coupling ring 112.

Three coupling pins 116 are mounted in regularly spaced relationship around the coupling ring 112, projecting radially inwardly from the coupling ring 112. Each of the coupling pins 116 is pressed into a radial bore 118. The coupling pins 116 are fixed against inward radial movement by means of heads 120 on the respective coupling pins 116, the heads 120 seating in respective counterbores 122 in the outer ends of bores 118.

Three regularly spaced locking pins 124 are similarly mounted in the locking ring 114, being pressed into respective radial bores 126 in the locking ring 114 and projecting radially inwardly from the inner surface of locking ring 114.

One or more axially directed slots 128, preferably three in number, are provided through the entire radial depth of the annular flange 106 integrally formed on the inside of the outer sleeve 96. The three axial slots 128 are disposed in regularly spaced relationship about the annular flange 106.

Three axial recesses 130 are provided in regularly spaced relationship in the outer wall of the coupling ring 112, the recesses 130 preferably being somewhat wider in a transverse or circumferential direction than the three slots 128 through flange 106. Similarly, three axial recesses 132 are disposed in regularly spaced relationship about the outer surface of the locking ring 114, the recesses 132 preferably having about the same circumferential or transverse width as the recesses 130 in the coupling ring 112. The three recesses 132 in the outer surface of locking ring 114 are preferably chamfered at 134 adjacent to the forward edge of the locking ring 114 to provide adequate clearance for movement of the lever member hereinafter described.

The recesses 130 in coupling ring 112 and the recesses 132 in locking ring 134 are disposed in substantial axial alignment with the respective slots 128 through flange 106. Three generally axially oriented elongated lever members 136 are pivotally engaged in the respective slots 128 in flange 106, each of the lever members 136 having an enlarged, rounded forward head portion 138 disposed in the respective recess 130 in coupling ring 112, and a similar enlarged rounded rearward head portion 140 disposed in the respective recess 132 in locking ring 114. The enlarged, rounded forward and rearward head portions 138 and 140, respectively, of each of the levers 136 are provided at the forward and rearward ends of an elongated connecting arm portion 142.

It is to be noted that the width of the slots 128 in flange 106 (in the circumferential or transverse direction) is somewhat greater than the width of the connecting arm portions 142 of the levers 136, so that the levers 136 will freely pivot in the slots 128. The enlarged rounded head portions 138 and 140 of the levers 136 are provided sufficient clearance in the respective recesses 130 and 132 to permit pivoting of the head portions 138 and 140 in their respective recesses 130 and 132. The chamfered forward edge portions 134 of the recesses 132 are desired in order to provide adequate room for substantial pivoting of the lever members 136.

When the coupling ring 112 and locking ring 114 are assembled within outer sleeve 96, and held in their operative positions by respective retainer rings 108 and 102, the lever members 136 are held against radial movement between the bottoms of recesses 130 and 132 on the inside and the inner wall of the outer sleeve 96 on the outside.

It will be apparent that the levers 136 will hold the coupling ring 112 and the locking ring 114 against free rotational movement within the outer sleeve 96, but will permit the rings 112 and 114 to rotationally shift through small arcs with respect to the outer sleeve 96.

Having described the presently preferred structure of my coupling device, I will now describe the manner in which it operates. The plug connector member 14 is axially engaged in the front marginal portion of the receptacle connector member 12, with the pin contact terminals 16 axially engaging in the respective socket contact terminals 18. The plug and receptacle connector members are polarized by engagement of the polarizing key 22 in the key-way 53.

The outer sleeve 96 is moved forward and rotated as required over the plug connector member 14 to operatively engage the three coupling pins 116 in the respective helical coupling grooves 78 in the receptacle shell 20. The outer sleeve 96 is then rotated clockwise to move the coupling pins 116 inwardly through the respective helical coupling grooves 78 until the pins 116 reach the inner ends 82 of the coupling grooves 78. Torque is transmitted from the outer sleeve 96 through its inner flange 106 and through the lever members 136 to the coupling ring 112 and coupling pins 116, the amount of torque required to overcome the axial engagement load between the plug and receptacle connector members being governed by the helix angle of the coupling grooves 78. In connection with the transmission of torque from the outer shell 96 to the coupling pins 116, it is to be noted that the amount of relative movement between the coupling pins 116 and the outer sleeve 96 is small, as best illustrated in Figs. 4, 5, 7 and 8, and is governed by the clearance between the levers 136 and the slots 128 and recesses 130 and 132 within which the levers are seated.

As the coupling pins 116 move inwardly through the helical coupling grooves 78, the locking pins 124 are moved forwardly into the respective locking grooves 84 through the respective triangular opening portions 86 thereof. When the coupling pins 116 reach the limit of their inward travel through coupling grooves 78 and engage against the inner ends 82 of the coupling grooves 78, the locking pins 124 will have moved to the inner ends of the triangular opening portions 86 of the locking grooves 84, into axial alignment with the transverse slot portions 88 of the locking grooves 84, in the phantom line position illustrated in Fig. 8. Further rotary motion of the outer sleeve 96 can not cause further clockwise rotation of coupling ring 112 because the coupling pins 116 are the limit of their clockwise travel, so that it causes pivoting of the levers 136 and clockwise rotation of the locking ring 114 to move the locking pins 124 clockwise through the transverse slot portions 88 of the locking grooves 84 until the locking pins 124 abut against the inner ends 90. This final movement of the parts is best illustrated in Fig. 8 of the drawings, the parts shifting from the phantom line position to the solid line position as the final clockwise rotation of the outer sleeve 96 causes locking engagement of the coupling.

It will be noted that the distance from the axial center of the sleeve flange 106 to the center of the forward rounded head portion 138 of each of the levers 136 is substantially less than the corresponding distance from the axial center of the flange 106 to the center of the rearward rounded head portion 140 of each lever 136. A presently preferred ratio between these distances is in the neighborhood of about 1 to 3. By this construction, when the outer sleeve 96 is rotated, torque is applied to the coupling ring 112 through the levers 136 with a substantial mechanical advantage over the application of torque to the locking ring 114 through the levers 136, this mechanical advantage preferably but not necessarily being on the order of about 3 to 1. Accordingly, when the coupling device is in the fully locked position, with the parts disposed in the solid line positions in Fig. 8, any anti-clockwise rotary loads imposed on the outer sleeve 96, either by direct contact with the outer sleeve 96 or by vibration of the coupling, apply anti-clockwise torque primarily to the coupling pins 116 instead of to the locking pins 124, whereby the coupling pins 116 tend to be driven down the helices of the helical coupling grooves 78, thus tending to wedge the locking pins 124 more tightly into their locked positions in the transverse slot portions 88 of the locking grooves 84. Similarly, any axial loads on the outer sleeve 96 in a direction tending to pull the plug and receptacle connector members apart merely tend to drive the coupling pins 116 down the helices of the coupling grooves 78 to increase the locking action.

If it is desired to uncouple the connector, all that is required is to apply a forward axial force to the outer sleeve 96 (a force in the direction which would tend to engage the plug and receptacle connector members), and in conjunction with this forward axial force to apply an anti-clockwise torque to the outer sleeve 96. This axial force overcomes the anti-clockwise force transmitted through the levers 136 tending to drive the coupling pins 116 down the helices, and holds the coupling pins 116 in the upper or inner ends of the helical coupling grooves 78 during the first part of the anti-clockwise movement of the outer sleeve 96, whereby sufficient anti-clockwise torque is applied from the sleeve flange 106 through the levers 136 to the locking ring 114 to move the locking pins 124 anti-clockwise out of the transverse slot portions 88 of the locking grooves 84 (i.e., from the solid line position to the phantom line position in Fig. 8). During this initial unlocking action, the coupling ring 112 remains stationary and the levers 136 pivot about their forward head portions 138.

Once the locking pins 124 are thus cleared from the transverse slot portions 88 of the locking grooves 84, the coupling pins 116 are free to travel anti-clockwise, downwardly out of the helical coupling grooves 78, to permit the complete uncoupling of the connector.

For convenience, I prefer to provide line-up marks (not shown) on the outer sleeve 96 and on the receptacle shell 20 to provide a visual indication of the locked position of the coupling device.

While the instant invention has been shown and described herein, in what is conceived to be the most practical and preferred embodiment, it is recognized that departures may be made therefrom within the scope of the invention, which is therefore not to be limited to the details disclosed herein, but is to be accorded the full scope of the claims.

Having described my invention, what I claim as new and desire to secure by Letters Patent is:

1. A coupling comprising first and second engaging members having operatively interengageable forward end portions, a forwardly opening external helical coupling groove having a closed rearward end formed in said first member, a forwardly opening external locking groove with a circumferentially extending inner slot portion formed in said first member, a coupling sleeve rotatably mounted on said second member and extending externally over the forward portion of said first member when said members are in the engaged position, an internal coupling pin mounted in said coupling sleeve and operatively engageable in said coupling groove, the coupling pin having support means mounted in said coupling sleeve in axially fixed, rotatably shiftable relation to the coupling sleeve, an internal locking pin mounted in said coupling sleeve and operatively engageable in said locking groove, the locking pin having support means mounted in said coupling sleeve axially spaced from said coupling pin support means and in axially fixed, rotatably shiftable relation to the locking sleeve, and a lever member pivotally mounted in the coupling sleeve axially between the coupling pin support means and the locking pin support means, the lever member being operatively engaged with the coupling pin support means on one axial side of its said pivotal mounting at a relatively short axial distance from said pivotal mounting, and being operatively engaged with the locking pin support means on the other axial side of its said pivotal mounting at a relatively long axial distance from said pivotal mounting.

2. A coupling according to claim 1 in which said coupling pin support means comprises a coupling ring rotatably shiftably mounted in said coupling sleeve, and said locking pin support means comprises a locking ring rotatably shiftably mounted in said coupling sleeve.

3. A coupling according to claim 2 in which said coupling ring is mounted axially forward of said locking ring in said sleeve.

4. A coupling according to claim 2 in which said coupling and locking rings are mounted on opposite axial sides of an internal annular flange in said sleeve, with said lever member pivotally mounted intermediate its ends in an axial slot in said annular flange, end portions of the lever member being pivotally engaged respectively in axial recesses in the respective coupling and locking rings.

5. An electrical connector comprising a plug connector member and a receptacle connector member, the plug member having a forward end portion operatively engageable within the forward end portion of the receptacle member, a forwardly opening external helical coupling groove having a closed rearward end formed in said receptacle member, a forwardly opening external locking groove having a circumferentially extending inner slot portion formed in said receptacle member, a coupling sleeve rotatably mounted on said plug member and extending externally over the forward portion of said receptacle member when said members are in the engaged position, a rotatably shiftable, axially fixed internal coupling ring mounted in said coupling sleeve and supporting an internal coupling pin operatively engageable in said coupling groove, a rotatably shiftable, axially fixed internal locking ring mounted in said coupling sleeve in axially spaced relation to said coupling ring, said locking ring supporting an internal locking pin operatively engageable in said locking groove, and a lever member pivotally mounted in the coupling sleeve axially between said coupling and locking rings, the lever member being operatively engaged with the coupling and locking rings respectively on opposite sides of its said pivotal mounting in said coupling sleeve, the axial distance from the pivotal mounting of the lever member to its said engagement with the coupling ring being substantially less than the axial distance from the pivotal mounting of the lever member to its said engagement with the locking ring, whereby said plug and receptacle connector members may be axially engaged and then drawn together by rotation of the coupling sleeve in a coupling direction with the coupling pin engaged in the coupling groove and the locking pin in the locking groove, further rotary movement of the coupling sleeve in the coupling direction when the coupling pin is stopped at the rearward end of the coupling groove causing the lever member to rotatably shift the locking ring into a locking position with the locking pin in said circumferentially extending inner slot portion of the locking groove, the coupling remaining in this locked position until an axial force is applied to the coupling sleeve to hold the coupling pin and coupling ring stationary while the coupling sleeve is rotated in an uncoupling direction to cause the lever member to rotatably shift the locking ring out of the locking position, moving the locking pin out of the circumferentially extending inner slot portion of the locking groove, whereby further rotation of the coupling sleeve in the uncoupling direction will uncouple the coupling pin from the coupling groove to permit axial separation of the plug and receptacle connector members.

6. An electrical connector according to claim 5, in which said coupling and locking rings are mounted on opposite axial sides of an internal annular flange in said coupling sleeve, with said lever member pivotally mounted in an axial slot in said annular flange, end portions of the lever members being pivotally engaged respectively in axial recesses in the respective coupling and locking rings.

7. An electrical connector according to claim 6, in which said coupling ring is mounted axially forward of said annular flange and said locking ring is mounted axially rearward of said annular flange.

8. An electrical connector according to claim 7, in which a plurality of said lever members are regularly spaced about the inside of said coupling sleeve, a plurality of said coupling pins being regularly spaced about the inside of said coupling ring and being operatively engageable in a plurality of said coupling grooves in said receptacle connector member, and a plurality of said locking pins being regularly spaced about the inside of said locking ring and being operatively engageable in a plurality of said locking grooves in said receptacle connector member.

No references cited.